Nov. 13, 1934.          L. BENNY          1,980,779
BATTERY CABLE TERMINAL
Filed Dec. 29, 1932
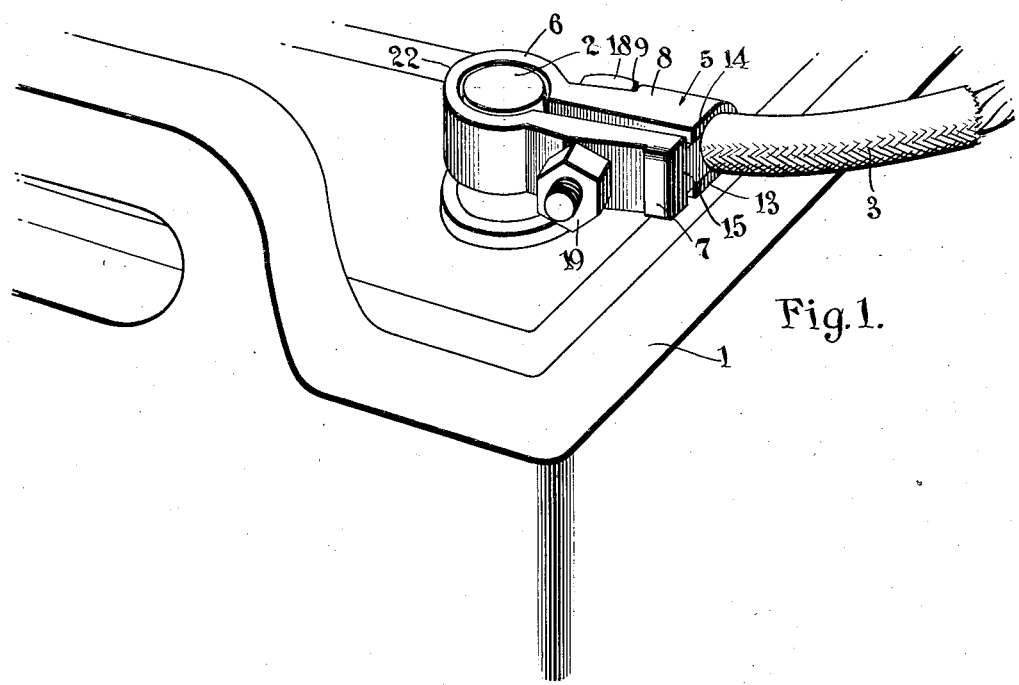
Fig.1.
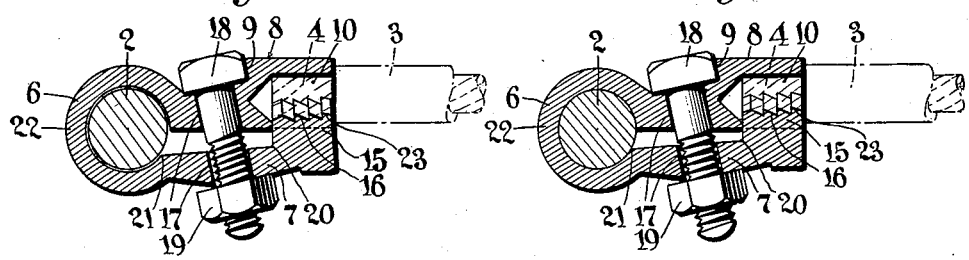
Fig.2.    Fig.3.
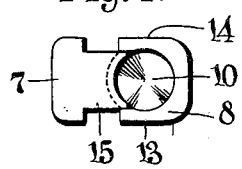 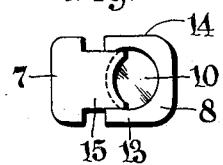 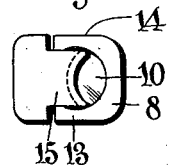
Fig.4.    Fig.5.    Fig.6.
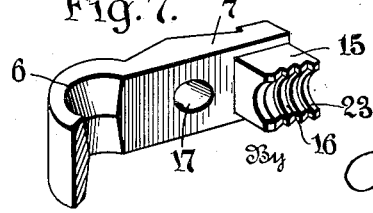
Fig.7.
Inventor
*Louis Benny*
By *Beau & Brooks* Attorneys Patented Nov. 13, 1934

1,980,779

UNITED STATES PATENT OFFICE 1,980,779

BATTERY CABLE TERMINAL

Louis Benny, Buffalo, N. Y., assignor to Herve C. Holly, Lockport, N. Y.

Application December 29, 1932, Serial No. 649,435

3 Claims. (Cl. 173—259)

The present invention relates to replaceable connectors for connecting storage battery terminal posts and battery cables.

It is well known, particularly in the present day use of the motor vehicle, that it is essential to the operation of the vehicle that secure contacts be maintained with the storage battery terminal posts in order to transmit from the battery the necessary electric current to operate the starter, the ignition system and the lighting system.

Although numerous devices have been tried to prevent it, corrosion attacks the cable and terminal post connectors, and numerous batteries are also subject to excessive vibration and both of these factors are contributing causes in the breakage of the connector or the cable at the connector. It has been the practice when a breakage of the type just referred to occurs, to either replace the entire cable or to bare the end of the cable and solder a new connector thereon, both of these remedies causing quite an expense and in the case of soldering, requiring the use of a soldering outfit.

One of the objects of the present invention is to provide a battery post cable connector that is solderless, requires no special tools to attach it and yet forms a tight non-breakable connection.

Another object of the invention is to provide a connector having only one tightening member, which will rigidly grip the bared end of a cable prior to gripping a battery terminal post. A further object of the invention is to provide a one-piece connector in which the clamping portions are always in correct alignment.

Still further objects of the invention are to provide a connector having interfitting cable clamping portions; a readily detachable and replaceable connector, and a universal connector designed to rigidly connect battery terminal posts of various sizes and cables of various sizes.

Other objects and advantages, including those arising from the novel formation and arrangements of the component portions of the device, are obvious or will appear from the following description of the typical embodiment of the invention illustrated in the accompanying drawing, wherein Fig. 1 is a perspective view of my invention in use.

Fig. 2 is a longitudinal sectional view of the connector showing the cable gripped between the clamping jaws.

Fig. 3 is a section similar to Fig. 2 but having the connector tightened on both the cable and battery terminal post.

Fig. 4 is an end view of the cable connecting end of the connector.

Fig. 5 is a view similar to Fig. 4 with the clamp portions in cable gripping relation.

Fig. 6 is a view similar to Fig. 5 with the clamp portions drawn together to show how a small diameter cable can be gripped.

Fig. 7 is a fragmentary perspective section of the connector.

As illustrated in Fig. 1, the storage battery 1 has a terminal post 2 to be connected to the non-insulated end 4 of a battery cable 3.

The connector of the present invention indicated generally at 5 comprises a preformed one piece unit made of brass or other suitable resilient or spring metal which may be provided with a non-corrosive coating if desired. The connector 5 is formed with a semi-circular battery post or clamping portion 6 having spaced arms 7 and 8. Arm 8 is provided with a shoulder 9 and at its free extremity has a substantially semi-circular cable receiving chamber 10 having side walls 13 and 14. The extremity of arm 7 is provided with an inwardly extending jaw 15 of sufficient size to loosely fit between the walls of the chamber 10. The face of jaw 15 is concave laterally and provided with transverse serrations 16. Registering bolt holes 17 are provided which are drilled diagonally through arms 7 and 8; bolt 18 is inserted through holes 17 and a nut 19 is screwed thereon.

Arms 7 and 8 are spaced sufficiently at 20 to allow the jaw 15 to extend into the chamber 10 to the position shown in Fig. 6 in order that a cable of very small diameter may be gripped and arms 7 and 8 are spaced even a greater distance at 21 for reasons which will be more clearly explained hereafter.

In the operation of the connector, the insulation is removed for a sufficient distance at the extremity of the cable and the uninsulated portion inserted into chamber 10. Nut 19 is tightened on bolt 18, the shoulder 9 on arm 8 preventing the rotation of the adjacent head of bolt 18. Tightening the nut and bolt causes the arms 7 and 8 to be drawn nearer together. Here it will be noted that arms 7 and 8 being formed of one piece, the tightening action is very rapid at the free ends thereof remote from their fulcrum or pivot point, which is in the battery post clamp portion of the connector, approximately at 22. The tightening action is continued until cable 4 is tightly gripped in chamber 10 by jaw 15. The cable will be first gripped by the outer end 23 of jaw 15 due to the action which has just been described and at this position and period of clamping the cable will be tightly gripped while clamp 6 has been compressed only slightly. Clamp 6 is then slipped over the battery terminal post 2 and nut 19 further tightened on bolt 18. Further tightening of the connector after jaw 15 has engaged cable 4 in chamber 10 by edge 23, causes edge 23 also to serve as a fulcrum point and cause direct tightening of arms 7 and 8 approximately at the point bolt 18 passes through them, this causes clamp 6 to tighten on post 2 and at the same time the face of jaw 15 becomes more nearly parallel with the face of chamber 10 and more of the serrations on the jaw face come into gripping contact with cable 4.

Arms 7 and 8, at the point where bolt 18 passes through them, and also at 21 where they diverge from clamp 6, are spaced sufficiently to insure the tightening of the clamp 6 upon even the smallest conventional type battery post, without the arms contacting each other.

It has been ascertained that by diagonally locating bolt 18 the initial rapid tightening action on cable 4 is accentuated and for this reason a diagonal location of the bolt is preferred.

It will readily be understood that my improved connector provides a readily replaceable one-piece device wherein separate parts do not have to be aligned or operated. The action of the single bolt, in providing the compression means for clamping both cable and battery post, renders the device extremely efficient, and the action of the connector in being able to retain its grip on the cable whether the battery post is clamped or not give it great practical utility.

It will be understood that the device herein described and illustrated is merely exemplary of the inventive features and principles involved, and that the latter may be embodied in other physical formations within the scope of the invention.

I claim as my invention:

1. A battery post and cable connector comprising a unitary structure having spaced arms joined at one end to form a battery post clamp, the free end portion of one arm including a cable receiving chamber and the free end of the other arm having an upraised jaw portion extending into said chamber, arcuate serrations on the face of one of said portions for gripping a cable, bolt holes through said arms intermediate their ends, a threaded bolt disposed through said holes and a nut on said bolt to apply clamping pressure to said arms, the distance from said jaw portion to the bolt being greater than the distance from said post clamp to the bolt, whereby the jaw portion is movable into clamping action in advance of the clamping action of the post clamp.

2. A battery cable to post connector comprising a one-piece substantially U-shaped spring metal member enlarged at its base to form a battery post clamp, spaced arms extending from said clamp, the extremity of one arm having a cable retaining chamber and the extremity of the other arm having a jaw-like projection adapted to fit in said chamber and compression means mounted between the clamp and chamber to compress said arms, the distance from the jaw-like projection to the compression means being greater than the distance from said post clamp to the compression means whereby the jaw-like projection is movable into clamping action in advance of the clamping action of the post clamp.

3. In a battery post to cable connecting device, a pair of spaced leg parts integrally joined at one end by a clamping loop portion adapted to receive a battery post, the free extremity of one leg part having an enlarged cable receiving chamber and the free extremity of the other leg part having a portion inter-fitting in said chamber, clamping means disposed through the intermediate portions of the leg parts of said device, said chamber providing an abutment adjacent one end of the clamping means for preventing rotation of said clamping means, the distance from the free ends of the leg parts to the intermediate clamping means being greater than the distance from the clamping loop portion to said intermediate clamping means whereby the free ends of the leg parts are movable into clamping action in advance of the clamping action of the clamping loop portion.

LOUIS BENNY.